United States Patent
Du et al.

(10) Patent No.: US 9,055,459 B2
(45) Date of Patent: Jun. 9, 2015

(54) METHOD AND SYSTEM FOR DUAL-MODE RATE CONTROL IN A WIRELESS COMMUNICATION SYSTEM

(71) Applicant: QUALCOMM Incorporated, San Diego, CA (US)

(72) Inventors: Shu Du, Milpitas, CA (US); Zhanfeng Jia, Belmont, CA (US); Ning Zhang, Saratoga, CA (US); James S. Cho, Mountain View, CA (US); Qinghai Gao, Sunnyvale, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 13/762,342

(22) Filed: Feb. 7, 2013

(65) Prior Publication Data
US 2014/0219111 A1     Aug. 7, 2014

(51) Int. Cl.
*H04W 24/02*     (2009.01)
*H04B 7/04*     (2006.01)
*H04L 1/00*     (2006.01)

(52) U.S. Cl.
CPC ............ *H04W 24/02* (2013.01); *H04B 7/0452* (2013.01); *H04L 1/0002* (2013.01); *H04L 1/0019* (2013.01); *H04L 1/0033* (2013.01)

(58) Field of Classification Search
None
See application file for complete search history.

(56) References Cited

U.S. PATENT DOCUMENTS

| | | | |
|---|---|---|---|
| 7,953,058 B2 | 5/2011 | Kwon et al. | |
| 8,064,325 B1 * | 11/2011 | Cioffi et al. | 370/203 |
| 2006/0187885 A1 * | 8/2006 | Roy et al. | 370/332 |
| 2009/0196372 A1 | 8/2009 | Zhang et al. | |
| 2010/0119001 A1 | 5/2010 | Walton et al. | |
| 2011/0003612 A1 | 1/2011 | Roy et al. | |
| 2011/0268214 A1 | 11/2011 | Khojastepour | |
| 2011/0274002 A1 * | 11/2011 | Pare et al. | 370/252 |
| 2013/0308723 A1 | 11/2013 | Miyata | |

FOREIGN PATENT DOCUMENTS

| | | |
|---|---|---|
| EP | 1699177 A1 | 9/2006 |
| WO | WO-2004038984 A2 | 5/2004 |
| WO | WO-2012101921 A1 | 8/2012 |

OTHER PUBLICATIONS

ISA/EPO, International Search Report and the Written Opinion of the International Searching Authority, Int'l App. No. PCT/US2014/014049, May 2, 2014, European Patent Office, Rijswijk, NL 13 pgs.

\* cited by examiner

*Primary Examiner* — Chi H Pham
*Assistant Examiner* — Shick Hom
(74) *Attorney, Agent, or Firm* — Holland & Hart LLP (57) ABSTRACT

A method of performing dual-mode rate control for an access point in a wireless communication system includes a single-user mode of operation and a multi-user mode of operation. In the single-user mode, a basic rate for a station is determined based on channel conditions. In the multi-user mode, a rate for a plurality of stations is determined using tracking. The tracking includes performing a sounding for the plurality of stations. An initial multi-user current rate is then set equal to a function of a number of users and the basic rate. A transmission is sent to the plurality of stations using the current rate. A packet error rate (PER) is detected during transmission to the plurality of stations. The current rate is adjusted based on the PER. After rate adjustment, either sounding is triggered or the method returns to sending a transmission using the current rate.

38 Claims, 5 Drawing Sheets

METHOD AND SYSTEM FOR DUAL-MODE RATE CONTROL IN A WIRELESS COMMUNICATION SYSTEM

BACKGROUND

The invention relates generally to transmission rate control, and in particular to a dual-mode transmission rate control in multi-user Wi-Fi® systems.

RELATED ART

IEEE 802.11 refers to a set of standards for implementing wireless local area network (WLAN) communication in the, e.g., 2.4, 3.6, and 5 GHz frequency bands. WLAN communication allows a device to exchange data wirelessly with one or more other devices. Wi-Fi® is a brand name for WLAN products using any of the IEEE 802.11 standards.

IEEE 802.11ac is a new standard being developed to support Very High Throughput (VHT) operations in the 5 GHz frequency band. To obtain this VHT operation, an 802.11ac device uses a wide RF (radio frequency) bandwidth, up to 8 spatial streams using multiple antennas at both the transmitter and receiver (called multiple-input multiple-output or MIMO in the wireless industry), thereby allowing a terminal to transmit or receive signals to/from multiple users in the same frequency band simultaneously. VHT operation also uses a high-density modulation of up to 256 QAM (quadrature amplitude modulation).

Beamforming is a technique using directional signal transmission or reception with multiple antennas to achieve spatial selectivity. For example, a transmitter can control the phase and amplitude of the signals at each antenna to create a pattern of constructive and destructive interference in the wavefront.

To correctly form a beam for MIMO communication, the transmitter needs to know the characteristics of the channel. To obtain these channel characteristics, the transmitter can send a known signal to a device, which allows that device to generate information regarding the current quality of the channel. The device can then send this channel state information (CSI) back to the transmitter, which in turn can apply the correct phases and amplitudes to form the optimized beam directed at the device. This process is called channel sounding or channel estimation (referenced as the sounding process herein).

In 802.11ac communication, an access point (AP) can use the sounding process to collect CSI from one or more potential destination stations. Thereafter, the AP can use the collected CSI as the current channel estimation to send downlink data to multiple stations in a multi-user MIMO (MU-MIMO) frame. Note also that the collected CSI can be used to send downlink data to one station in a SU-MIMO frame, wherein SU-MIMO is a single-user MIMO (a beamforming technique using multiple antennas at one station).

When the SU-BF or MU-MIMO data is sent out immediately after a sounding process (e.g., 1-10 ms), the CSI information used for SU-BF/MU-MIMO data transmission is fresh, and the packet will have a higher chance to be delivered successfully. On the other hand, if the SU-BF/MU-MIMO data is sent out even a brief time after the last sounding process, the CSI information used in generating single-user beamforming (SU-BF) or MU-MIMO data transmission can be stale and the packet may have a lower chance of being delivered successfully.

Traditional rate adaptation algorithms in single-user (SU) Wi-Fi® systems select a new rate based on the recent history of transmission successes or failures. If sounding has been recent, then the packet is typically delivered successfully using the appropriate modulation and coding scheme (MCS) based on the CSI of the sounding, and the sender will try to probe a higher MCS next time. In contrast, if a packet is delivered with a high packet error rate (PER) using a specific MCS, then the sender will try to lower the MCS to increase the chance that future packets will be delivered successfully.

The process of selecting an appropriate MCS for given channel conditions is referred to as rate adaptation. Performing rate adaptation in MU Wi-Fi® systems is not straight forward. Specifically, the rate adaptation algorithm may be requested to provide SU-OP (Single-User Open loop, aka, non-beamforming), SU-BF, or MU-MIMO rates to a destination node. Eliminating the option of SU-OP does not simplify the problem because a rate adaptation still needs to select the best MCS for both SU-BF and MU-MIMO transmission despite the fact that the best rate for each can differ markedly.

Depending upon channel condition or MU-MIMO level (2-user or 3-user), SINR (signal to interference noise ratio) of 3-user MU-MIMO, 2-user MU-MIMO, and SU-BF transmissions can differ substantially, even if the CSI information has the same age.

The situation gets even more complicated in that, under different channel conditions, for example, with Doppler and without Doppler, the SINR gaps among 3-user MU, 2-user MU, and SU-BF can be markedly different as well. These variations make rate selection even more difficult.

One straightforward way to perform rate adaption for MU-MIMO systems is to track the best MCS separately for different transmit (TX) modes. Under such a scheme, transmission history of SU-BF, 2-user MU-MIMO, and 3-user MU-MIMO will be tracked independently from each other and each of them will perform as described in the traditional rate adaption algorithm. However, doing this will significantly increase the memory requirement and complexity of the algorithm. Another drawback is that at some specific duration, the sender may use the same TX mode to the destination, so the rate of that specific TX mode can be tracked well. However, when switching to a different TX mode, the sender has to take a predetermined period to determine the best MCS of the new TX mode.

Therefore, what is needed is a rate adaptation method having improved computational cost for use in MU WLAN systems, including Wi-Fi® systems.

SUMMARY OF THE EMBODIMENTS

A method for performing dual-mode rate control for an access point in a wireless communication system is provided. In a single-user mode (SU-mode), an SU-basic rate for a station is determined based on channel conditions. In a multi-user mode (MU-mode), an MU-rate is determined for a plurality of stations using tracking. The MU-mode tracking includes performing a sounding for the plurality of stations, then determining an MU-rate, and sending a transmission to the plurality of stations using the MU-rate. A packet error rate (PER) is detected during the MU transmission to the plurality of stations, and the MU-rate can be reduced based on the PER. A new sounding is performed when triggered, and otherwise transmission is resumed.

A method for adjusting an MU-rate for use in the dual-mode rate control method is also provided. The MU-rate is reduced by 1 when a lower threshold is less-than-or-equal-to a PER of a preceding AMPDU, and the PER is less-than-or-equal-to an upper threshold. The MU-rate is reduced by 2 when the upper threshold is less than the PER, and the MU-rate remains unchanged otherwise.

A method for re-adjusting an MU-rate for use in the dual-mode rate control method is also provided. Following an in-loop sounding, the MU-rate is reset to be the same rate used by the first AMPDU of a preceding sounding interval. The MU-rate can be decreased by 1 when the PER of a first AMPDU of the preceding sounding interval is greater than an upper threshold. Alternatively, the MU-rate can be increased by 1 when an average of a predetermined number of PERs of the preceding sounding interval is less than a lower threshold. The MU-rate remains unchanged otherwise.

A computer-readable medium storing instructions for providing the dual-mode rate control method is also provided. A dual-mode wireless communication system embodying the rate-control method is provided.

DETAILED DESCRIPTION OF THE DRAWINGS

What is described below are embodiments for systems and methods for rate adaptation including, but not limited to, improved computational cost for use in MU WLAN systems, including Wi-Fi® systems. For WLAN systems, and especially MU Wi-Fi® systems, a unified rate adaptation algorithm can advantageously track the best noticed rates of different TX modes (e.g., SU-BF, SU-MIMO, MU-MIMO, etc.) concurrently, thereby saving significant overhead of memory and computing, as well as providing more accurate and timely MCS suggestions compared to separate TX mode tracking.

Figure 1A:
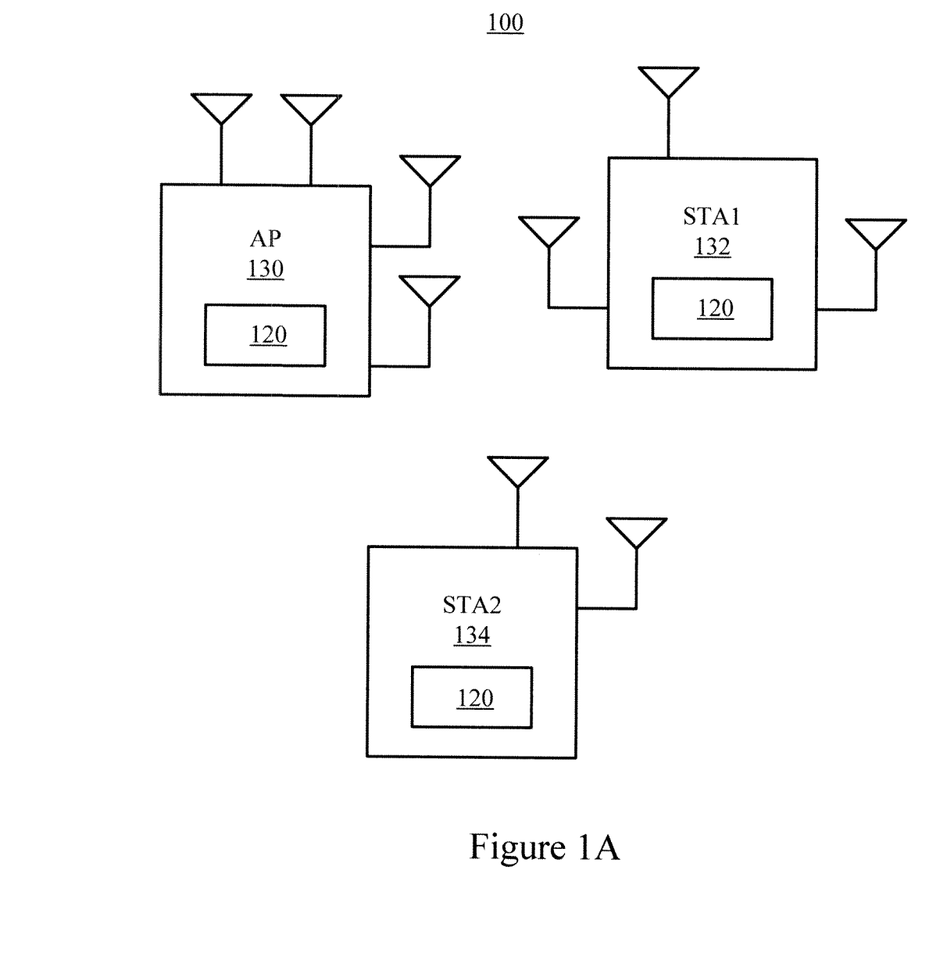
FIG. 1A illustrates an example basic service set (BSS) including an AP and two stations, STA1 and STA2.

FIG. 1A illustrates an example basic service set (BSS) 100 including an AP 130 and two stations STA1 132 and STA2 134. In one embodiment, each device 130, 132, and 134 includes a transceiver 120 (transmitter and receiver) configured for operation in accordance with a WLAN standard (e.g., the IEEE 802.11ac standard). FIG. 1A will be referred to in describing the following figures for illustration. However, limitations should not be placed on embodiments of the disclosure based on the illustration of the BSS 100. For example, BSS 100 may include more than two STAs (not illustrated for simplicity of describing embodiments of the disclosure). Additionally, the AP 130 may be a dedicated AP, soft-AP or otherwise a STA acting as an AP, etc. for the BSS 100. Furthermore, while two, three or four antennas are illustrated for each device, embodiments of the disclosure are not limited to specific numbers of antennas or specific numbers of transmit/receive chains for the devices.

Figure 1B:
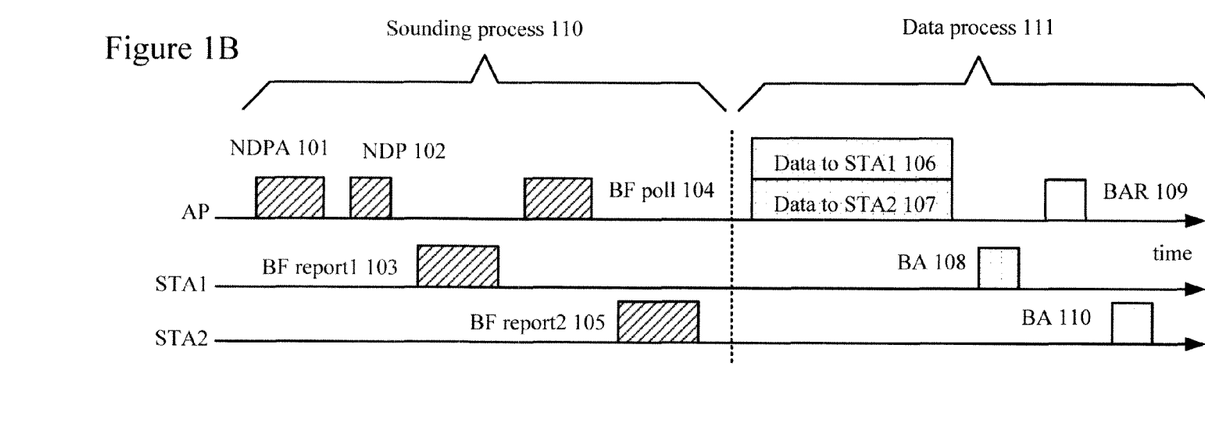
FIG. 1B illustrates an exemplary communication timing diagram between the AP and the stations STA1 and STA2 shown in FIG. 1A, including a sounding process for establishing current communication channel quality.

FIG. 1B illustrates an exemplary communication timing diagram between the AP 130 and the stations STA1 132 and STA2 134 of FIG. 1A. The communication illustrated in FIG. 1B includes two processes: a sounding process 110 and a data process 111. Sounding process 110 begins with the AP 130 sending a null data packet announcement (NDPA) signal 101 to stations STA1 132 and STA2 134, wherein the NDPA signal 101 indicates that no data will be sent in the subsequent packet. Following the NDPA signal 101, the AP 130 sends a null data packet (NDP) signal 102. This NDP signal 102 can serve as a known signal for obtaining channel characteristics from the stations STA1 132 and STA2 134. After receipt of the NDP signal 102, station STA1 132 can send to the AP 130 its CSI in a beamforming (BF) report1 signal 103. In receiving the BF report1 signal 103, the AP 130 can send a BF poll signal 104 indicating that the station STA2 134 can send to the AP 130 its CSI. In response to receiving the BF poll signal 104, STA2 134 can send to the AP 130 its CSI in a BF report2 signal 105.

Using the CSI from its associated stations STA1 132 and STA2 134, the AP 130 can begin the data process 111 by concurrently sending MU-MIMO data 106 to STA1 132 and MU-MIMO data 107 to STA2 134. Note that although the term MU-MIMO is used to describe the data, the data may also be SU-MIMO in other embodiments. After receiving the data 106, the station STA1 132 can send to the AP 130 a block acknowledgement (BA) signal 108. Upon receiving the BA signal 108 from STA1 132, the AP 130 can send to STA2 134 a block acknowledgement request (BAR) signal 109. In response to receiving BAR signal 109, STA2 134 can send to the AP 130 its BA signal 110. Note that although FIG. 1A shows an AP associated with two stations, in other embodiments the AP can be associated with any number of stations, each of which can send a BF report signal during the sounding process 110 and a BA signal during the data process 111.

Figure 2:
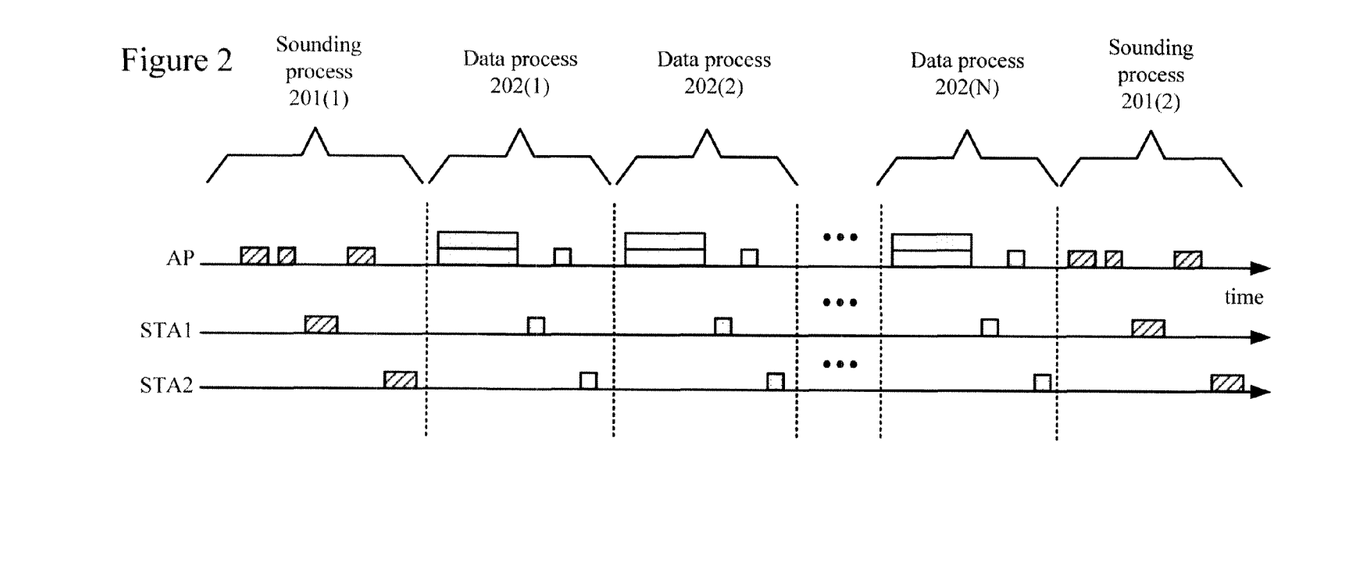
FIG. 2 illustrates a timing diagram, between the AP and the stations STA1 and STA2 shown in FIG. 1A, including a first sounding process followed by a plurality of data processes and a second sounding process.

Because the sounding process has a large overhead in terms of medium airtime, the AP 130 can be configured not to do sounding prior to every MU-MIMO data transmission, as illustrated in the timing diagram of FIG. 2.

FIG. 2 illustrates a first sounding process 201(1) followed by a plurality of data processes 202(1)-202(N), wherein N is an integer greater than 1. After the N data processes are complete, a second sounding process 201(2) is performed before another plurality of data processes are performed (not shown).

A possible data rate for a transmission can be limited by the number of spatial streams used in the transmission, the modulation type, and the coding rate. Hence, the number of spatial streams, modulation type, coding rate, and resulting maximum data rates (or a portion of such information) may be included in a modulation and code scheme (MCS) for the STA. For example, the IEEE 802.11 family of standards defines various modulation and coding schemes, and represents them by index values. In one specific example regarding IEEE 802.11n (but which is applicable to other WLAN systems, e.g., 802.11ac), Table 1 below (taken from IEEE 802.11n) shows exemplary MCS index values and their respective spatial streams, modulation types, coding rates, and resulting maximum data rates. Note that data rates are provided for both 20 MHz and 40 MHz channels, as well as 800 ns and 400 ns guard intervals (GIs).

TABLE 1

| | | | | Data rate (Mbit/s) | | | |
|---|---|---|---|---|---|---|---|
| | | | | 20 MHz channel | | 40 MHz channel | |
| MCS | Spatial streams | Modulation type | Coding rate | 800 ns GI | 400 ns GI | 800 ns GI | 400 ns GI |
| 0 | 1 | BPSK | ½ | 6.50 | 7.20 | 13.50 | 15.00 |
| 10 | 2 | QPSK | ¾ | 39.00 | 43.30 | 81.00 | 90.00 |
| 19 | 3 | 16-QAM | ½ | 78.00 | 86.70 | 162.00 | 180.00 |
| 31 | 4 | 64-QAM | ⅚ | 260.00 | 288.80 | 540.00 | 600.00 |

The transmitter (e.g., from transceiver 120 of AP 130) attempts to determine an acceptable MCS under which parameters to send the data frames. Using a higher MCS may increase some receivers' failure to decode the data frames, thereby increasing the PER. However, using a lower MCS may cause inefficiency in medium usage and network congestion, thus slowing transmission speed. Therefore, choosing a proper MCS for data frame transmissions is a tradeoff between reliability and speed in order to find an acceptable compromise.

Figure 3:
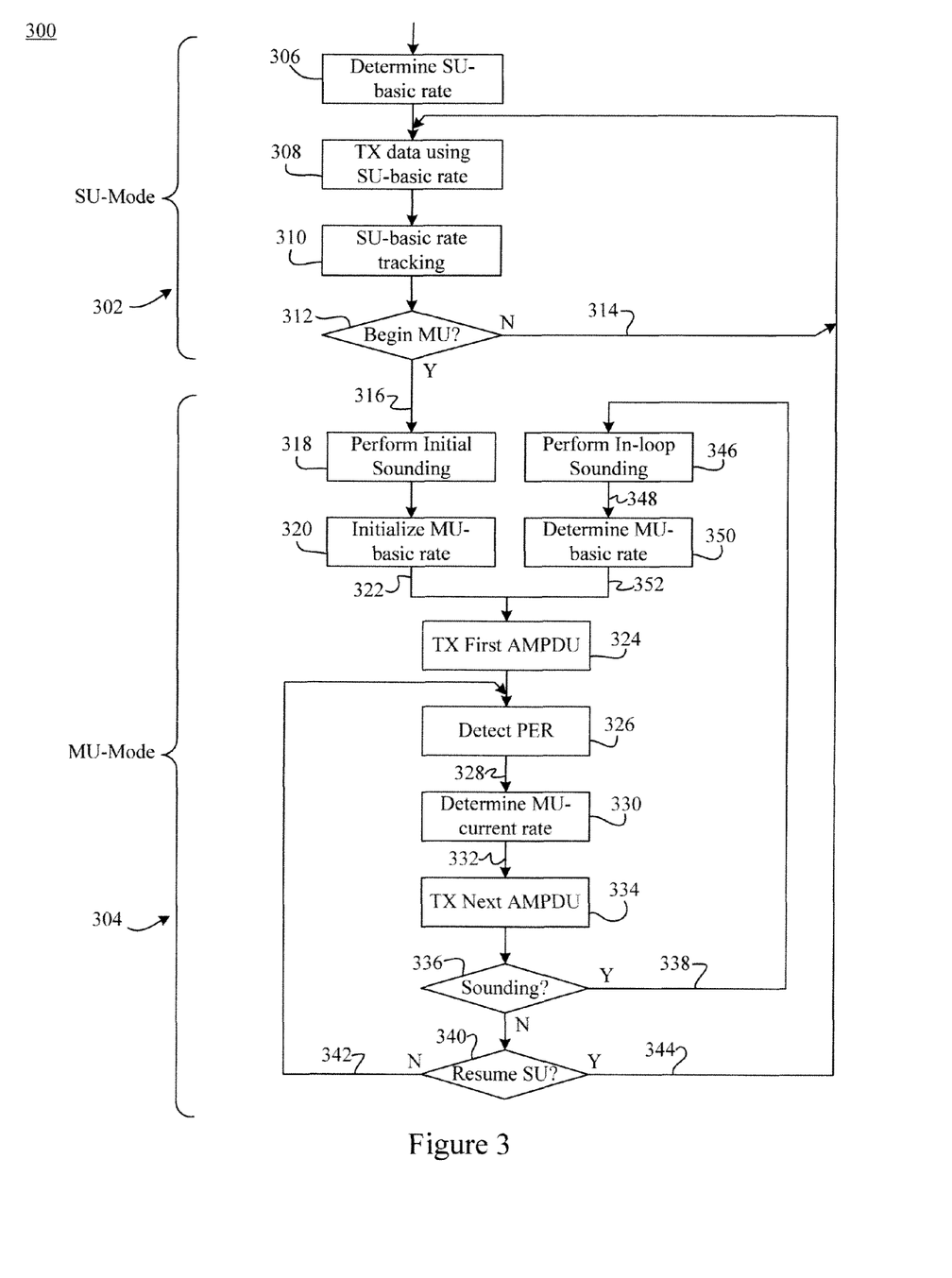
FIG. 3 illustrates an exemplary dual-mode rate control method for determining and periodically adjusting transmission rates in a first operational mode and a second operational mode for a communication system, such as the communication system illustrated in FIG. 1A.

FIG. 3 illustrates an exemplary dual-mode rate control method 300 for determining and periodically adjusting transmission rates in a first operational mode and a second operational mode for a communication system, such as the communication system illustrated in FIG. 1A. The first operational mode 302 includes 306-312, and a return path 314 to 308. The second operational mode 304 includes 318-350, return paths 338, 342, and 344, and entry/exit paths 316, 322, 328, 332, 348, and 352.

In some embodiments of method 300, operation during the first operational mode 302 occurs in a single-user mode (SU-mode) of communicating, and includes SU-OP, SU-BF, and SU-MIMO modes of operation. In these embodiments, operation during the second operational mode 304 occurs in a multi-user mode (MU-mode) of communicating, and includes MU-MIMO (e.g., 2-user and 3-user). Thus the first operational mode in FIG. 3 is depicted as SU-mode 302, while the second operational mode is depicted as MU-mode 304.

SU-mode 302 begins at 306 by determining an SU-basic transmission rate (SU-basic rate). Data transmission occurs at 308 using the SU-basic rate, and the SU-basic rate is thereafter adjusted at step 310 using tracking. Traditional single-user rate adaptation algorithms can be used for this purpose. A traditional single-user rate adaption algorithm usually considers the packet error rate (PER) of the current transmit rate. When a PER is too high, it lowers the rate; or when the PER is low contiguously, it may try to probe a higher rate. A single-user rate adaptation algorithm sometimes also considers the other information, such as the received signal strength indicator (RSSI) of the packet from the destination station, to help decide the transmit rate to the same destination station. When the RSSI of the packet from the destination station is high, it may increase the transmit rate; when the RSSI of the packet from the destination station is low, it may decreases the transmit rate.

A test at 312 determines whether to suspend SU-operation and advance to MU-mode 304. In general, an AP (e.g., 130 of FIG. 1A) needs to serve many stations, such as 132, 134 of FIG. 1A, and station traffic can be characterized as bursty. As a result, when an AP performs in a round-robin or other periodic mode, sounding is needed every time. Such periodic sounding introduces overhead without a significant benefit. An MU-mode of operation needs fresh channel condition information (CIS) to properly establish and maintain multi-user operation. Thus, an embodiment is to begin an MU-mode 304 on demand. For example, when a queue of waiting station traffic exceeds a predefined threshold, the test at 312 selects path 316 to commence an MU-mode 304. Otherwise, the flow proceeds along return path 314, continuing the SU-Mode 302 at 308.

The following description of MU-Mode 304 relates to the lower two-thirds of FIG. 3. Details are provided in TABLE 2, and FIGS. 4A and 4B, for 320, 330, and 350, which relate to initializing and tracking MU-basic and MU-current transmission rates. In an embodiment, an MU-basic rate is initialized following a first sounding, and is adjusted following each subsequent sounding during MU-Mode 304. The resulting MU-basic rate is used to transmit a first AMPDU of a sounding interval, and to initialize the MU-current rate for use throughout the remainder of the sounding interval. A sounding interval includes all operations occurring from one sounding to a next. The initialized MU-current rate may be tracked using a packet error rate (PER), and the tracked rate may be used to transmit all other data of the sounding interval.

Upon entry of MU-mode via path 316, an initial sounding is performed at 318. An MU-basic rate is initialized at 320 (as described below), the MU-basic rate is used to transmit a first AMPDU at 324, and the MU-current rate is set to the value of the MU-basic rate (not illustrated). Thereafter, operation in MU-mode 304 spends the remainder of the sounding interval in a loop that includes 326, 330, 334, 336, 340, and return path 342. This loop is referred to as the inner-loop. A packet error rate (PER) for the immediately preceding AMPDU is detected at 326, and is used, at 330, for adjusting the value of the MU-current rate used for transmitting a next AMPDU at step 334. The adjustment of the MU-current rate is described with respect to FIG. 4A.

In an embodiment, operation in the inner-loop continues, until one of the following events occurs: (1) the CIS obtained at a most recent sounding has become too stale, and a new sounding must be performed; or (2) the length of a traffic queue falls below a predetermined lower threshold, and operation in SU-mode 302 is resumed. When a new sounding is to be performed, the test at 336 selects path 338 and continues to 346. Otherwise, the test at 340 is performed to determine whether to terminate MU-Mode 304 and return to SU-Mode 302. If Su-Mode 302 is to be resumed, the test selects path 344 and operation continues from 308. Otherwise, the test selects path 342 and operation continues at 326.

When a new sounding is performed at 346 (referred to as an in-loop sounding), a new value for the MU-basic rate is determined at 350, and is used to transmit a first AMPDU at 324. The MU-current rate is again set to the value of the MU-basic rate (not illustrated). Thereafter, operation reverts to the inner-loop of MU-Mode 304 (326, 330, 334, 336, 340, and return path 342) until terminated by test 336 or test 340.

One way to initialize the MU-basic rate at 320 is to make the MU-basic rate equal to the most currently tracked value of the SU-basic rate. However, results of simulations of multi-user traffic show that a different approach may improve high multi-user throughput. In some embodiments, instead of setting the initial value of the MU-basic rate to the most recent value of the SU-basic rate, an initial value for the MU-basic rate may be derived as a function of the most-recently tracked SU-basic rate. An example of such a function is shown in TABLE 2.

TABLE 2

| SU-basic rate (x) | MU-2 Basic Rate (y) | MU-3 Basic Rate (z) |
|---|---|---|
| x = 9 (i.e., MCS9) | y = x | z = x − 2 |
| x = 8 | y = x − 1 (MCS7) | z = x − 3 (MCS 5) |
| 3 < x < 8 | y = x − 2 | z = x − 3 |
| x ≤ 3 | y = x − 2 | n/a |

The left-hand column of TABLE 2 lists various possible SU-basic rates designated by the variable x. These rates are expressed as levels of MCS. For example, in the second row, x=9, referring to level MCS9. In the third row, x=8, referring to MCS8. In the fourth row, x is greater than MCS3 and is less than MCS8, thus x refers to MCS4-MCS7. In the bottom row, x refers to MCS0-MCS3.

The center column of TABLE 2 establishes a relationship between the SU-basic rate x and an MU-basic rate for 2-user MU operation, designated MU-2 Basic Rate, and further designated by the variable y. Thus, in the second row, when the SU-basic rate x is MCS9, the MU-2 Basic Rate y is also MCS9. In the third row, when the SU-basic rate is MCS8, the MU-2 Basic Rate is MCS7 (x−1). In the fourth and fifth rows, the MU-2 Basic Rate is two less than the SU-basic rate (x−2).

Finally, the right-hand column of TABLE 2 establishes a relationship between the SU-basic rate x and an MU-basic rate for 3-user MU operation, designated MU-3 Basic Rate, and further designated by the variable z. Note that the initial values for 3-user MU operation may be less than those for 2-user MU operation. In some embodiments, as illustrated in the lower right-hand corner of the table, when the most recently tracked value of the SU-basic rate is in the range MCS0-MCS3, 3-user MU operation is not used, as indicated by the symbol "n/a."

It should be noted that the mapping function illustrated in TABLE 2 is exemplary only, where the specific mappings may have been determined by use of MU traffic simulations.

In method 300 of FIG. 3, two MU-mode transmission rates are being tracked. An MU-basic rate is initialized (step 320) following an initial sounding (step 318), and then is adjusted thereafter following each in-loop sounding (step 346). An MU-current rate is initially set to the MU-basic rate and is adjusted thereafter based on the PER of the immediately preceding AMPDU each time around the inner-loop. TABLE 2, above, provides an example of a rate-setting function useful for initializing the MU-basic rate. Methods illustrated by FIGS. 4A and 4B provide examples useful for adjusting the values of the MU-current rate and the MU-basic rate on an on-going basis, respectively.

Figure 4A:
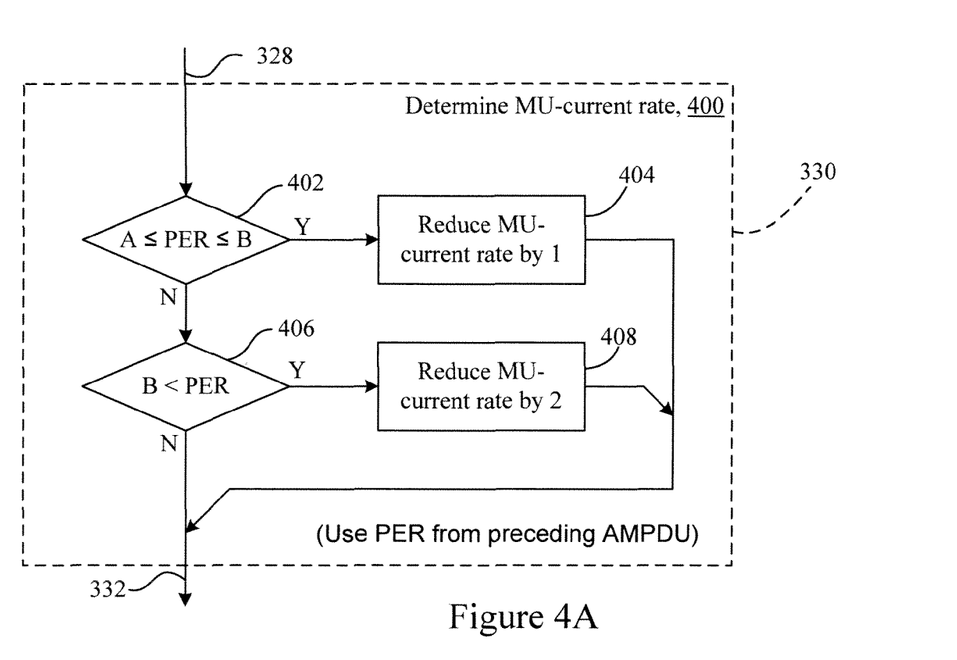
FIG. 4A illustrates an exemplary method for determining a multi-user current transmission rate as part of the rate control method illustrated in FIG. 3.

FIG. 4A illustrates an exemplary method 400 for determining a multi-user current transmission rate (MU-current rate) as part of the rate control method illustrated in FIG. 3. In an embodiment, the details within the broken line surrounding method 400 correspond to 330 of FIG. 3. Entry to method 400 corresponds to path 328 of FIG. 3. The exit path for method 400 corresponds to path 332 of FIG. 3.

Upon entry to method 400, the MU-current rate has been set to the value of the MU-basic rate (not illustrated). The MU-current rate determination strategy embodied by the method 400 takes one of three alternative actions based upon the value of the detected PER of the preceding AMPDU. When the PER is greater-than-or-equal-to a lower threshold A, and is less-than-or-equal-to an upper threshold B (test at 402, or alternatively just greater than A and less than B), the MU-current rate is reduced by 1 (at 404). When the PER is greater-than the upper threshold B (test at 406), the MU-current rate is reduced by 2 (at 408). When neither of these conditions exists, the MU-current rate at time of entry remains unchanged at time of exit. Thus, when the answer to both tests at 402 and 406 is NO, the MU-current rate is unchanged. In a specific example, the lower threshold A=0.1 (10%), and the upper threshold B=0.5 (50%).

Figure 4B:
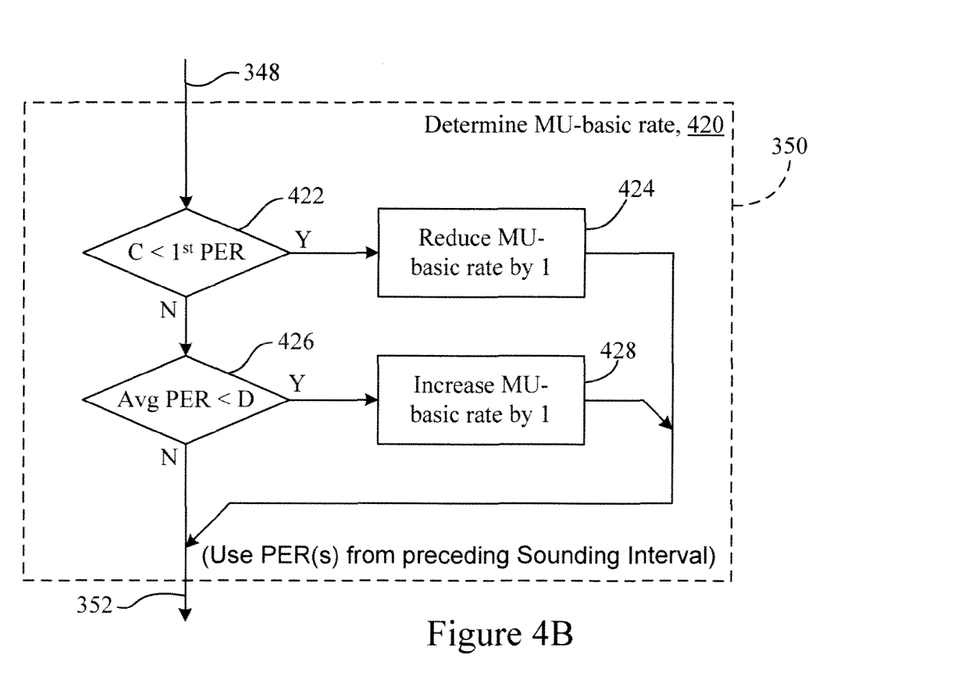
FIG. 4B illustrates an exemplary method for determining a multi-user basic transmission rate following an in-loop sounding as part of the rate control method illustrated in FIG. 3.

FIG. 4B illustrates an exemplary method 420 for determining a multi-user basic transmission rate following an in-loop sounding as part of the rate control method illustrated in FIG. 3. The details within the broken line surrounding the method 420 correspond to 350 of FIG. 3. The entry path for method 420 corresponds to path 348 of FIG. 3, and the exit path for method 420 corresponds to path 352 of FIG. 3.

A sounding interval is the sequence of operations that occur from one sounding to a next. The in-loop sounding that occurs at 346 of FIG. 3 ends a preceding sounding interval and begins a current sounding interval. An MU-basic rate is initialized at 320 following the initial sounding at the beginning of MU-mode 304, and is adjusted (in one embodiment) by method 420 following each in-loop sounding (346 of FIG. 3) as the MU-mode continues. The value of the MU-basic rate at the time of entry into method 420 is the MU-basic rate that was established following a sounding at the beginning of the preceding sounding interval. The method 420 will adjust that entry value based upon the value of PER(s) from the preceding sounding interval.

When the PER for the first AMPDU of the preceding sounding interval is greater than an upper threshold C (e.g., when C=0.5, $0.5 < 1^{st}$ PER), the initial MU-basic rate is reduced by 1 at 424. When the $1^{st}$ PER of the preceding sounding interval does not exceed a lower threshold, but an average of PERs for a predetermined number of initial AMPDUs (e.g., the average of the first three AMPDUs of the previous sounding interval) is less than a lower threshold D (e.g., when D<0.01 (1%), AVG<0.01 (1%)) at the test of 426, the initial value of the MU-basic rate is increased (e.g., by 1) at 428. When neither test 422 nor 426 results in a change to the initial value of the MU-basic rate, then the value of the MU-basic rate at time of entry to method 420 remains unchanged at exit path 352.

In some embodiments of a method for performing a dual-mode rate control for an access point in a wireless communication system, the method includes both single-user and multi-user modes of operation, as illustrated by method 300 of FIG. 3. In some embodiments of the single-user mode, an SU-basic rate for a station is determined (306) based on channel conditions. In some embodiments of the multi-user mode, an MU-rate for a plurality of stations (e.g., stations 132, 134 of FIG. 1A) is determined using tracking. In some embodiments, the MU-rate tracking includes: performing an initial sounding (318) for the plurality of stations, initializing the MU-rate (320), sending a transmission to the plurality of stations using the MU-rate (324, 334), detecting a packet error rate (326) during the transmission to the plurality of stations, adjusting the MU-rate based on the PER (330), performing an in-loop sounding when triggered (346), re-adjusting the MU-rate following the in-loop sounding (350), and returning to sending a transmission (continuing in the inner-loop via path 342). In some embodiments, following the in-loop sounding, the MU-rate is reset to be the same rate used by the first AMPDU of a preceding sounding interval (not illustrated). The reset MU-rate can be re-adjusted as shown in FIG. 4B.

Figure 5:
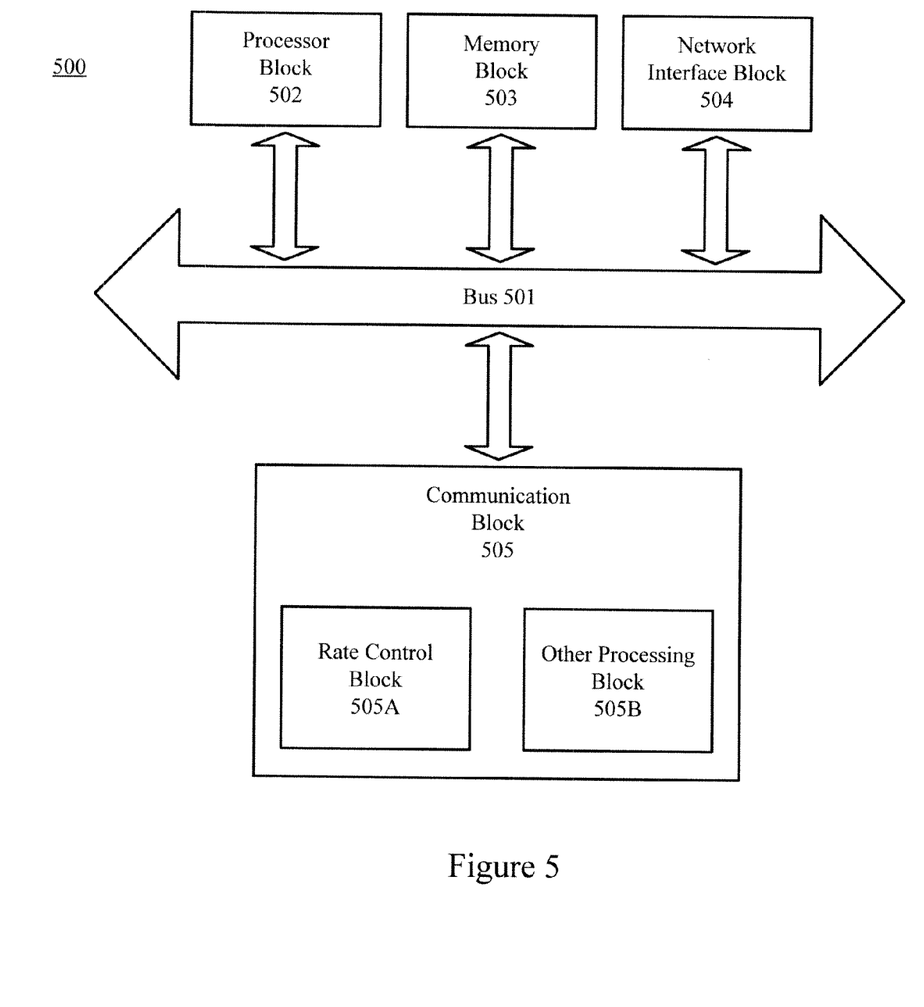
FIG. 5 illustrates a simplified electronic device including a rate control block that can perform the dual-mode rate control method shown in FIGS. 3 and 4.

Certain aspects of the dual-mode rate control method 300, as illustrated in FIG. 5, may take the form of an entirely software embodiment (including firmware, resident software, micro-code, etc.) or an embodiment combining software and hardware aspects that may all generally be referred to herein as a "circuit," "module" or "system." Furthermore, embodiments of the disclosure may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette), optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions (e.g., executable by one or more processing units). In addition, machine-readable signal medium embodiments may be embodied in an electrical, optical, acoustical, or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Although the rate control methods can be performed by an AP, an electronic device having wireless capability typically includes certain components that may or may not be characterized as part of an AP. Indeed, in some embodiments, certain components of the electronic device may be characterized as outside the AP, but still assist in one or more steps of the data scheduling technique.

FIG. 5 illustrates a simplified electronic device 500 including a rate control block 505A, which can substantially perform the unified rate adaptation method 300. The electronic device 500 may be a notebook computer, a desktop computer, a tablet computer, a netbook, a mobile phone, a gaming console, a personal digital assistant (PDA), or other electronic system having wireless (and wired, in some cases) communication capabilities.

The electronic device 500 can include a processor block 502 (possibly including multiple processors, multiple cores, multiple nodes, and/or implementing multi-threading, etc.). The electronic device 400 can also include a memory block 503, which may include cache, SRAM, DRAM, zero capacitor RAM, Twin Transistor RAM, eDRAM, EDO RAM, DDR RAM, EEPROM, NRAM, RRAM, SONGS, PRAM, and/or another type of memory cell array. The electronic device 500 also includes a network interface block 504, which may include at least a WLAN 802.11 interface. Other network interfaces may include a Bluetooth interface, a WiMAX interface, a ZigBee® interface, a Wireless USB interface, and/or a wired network interface (such as an Ethernet interface, or a powerline communication interface, etc.). The processor block 502, the memory block 503, and the network interface block 504 are coupled to a bus 501, which may be implemented in accordance with PCI, ISA, PCI-Express, Hyper-Transport®, InfiniBand®, NuBus, AHB, AXI, or another bus standard.

The electronic device 500 also includes a communication block 505, which can include a rate control block 505A and another processing block 505B. The other processing block 405B may include, but is not limited to, portions of a transceiver for processing received signals, for processing to be transmitted signals, and for coordinating actions of the receiver and transmitter portions. Other embodiments may include fewer or additional components not illustrated in FIG. 5, such as video cards, audio cards, additional network interfaces, and/or peripheral devices. In one embodiment, the memory block 503 may be connected directly to the processor block 502 to increase system processing.

The above description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, although selecting a data rate is described in detail above, this selection can be characterized as also selecting an MCS (modulation and coding scheme) (see TABLE I). Thus, the present invention is not intended to be limited to the embodiments shown herein but is to be accorded the widest scope consistent with the principles and novel features disclosed herein.

The invention claimed is:

1. A method for performing dual-mode rate control for an access point in a wireless communication system, the method comprising:
    in a single-user mode (SU-mode), determining an SU-basic rate for a station in the wireless communication system based on channel conditions; and
    in a multi-user mode (MU-mode), determining an adjusted MU-rate using tracking for a plurality of stations, the tracking further comprising:
        performing an initial sounding for each of the plurality of stations;
        initializing an MU-rate;
        sending a transmission to the plurality of stations using the MU-rate;
        detecting a packet error rate (PER) corresponding to the transmission to the plurality of stations;
        adjusting the MU-rate based on the PER;
        performing an in-loop sounding when triggered; and
        re-adjusting the MU-rate following the in-loop sounding.

2. The method of claim 1, wherein initializing the MU-rate comprises:
    selecting one of a 2-user MU operation and a 3-user MU operation; and
    selecting an initial MU-rate based on a number of users and the SU-basic rate.

3. The method of claim 2, wherein selecting the initial MU-rate based on the number of users and the SU-basic rate comprises:
for 2-user MU operation:
selecting modulation and coding scheme (MCS) 9 when the SU-basic rate equals MCS9,
selecting MCS7 when the SU-basic rate equals MCS8, and
selecting MCS(x-2) when the SU-basic rate is MCS(x) wherein x is an integer less than eight; and
for 3-user MU operation,
selecting MCS7 when the SU-basic rate equals MCS9,
selecting MCS(x-3) when the SU-basic rate is MCS(y) wherein y is an integer less than or equal to eight and greater than 3.

4. The method of claim 1, wherein adjusting the MU-rate comprises:
setting the MU-rate to MCS(x31 1) when the PER is greater-than-or-equal-to a lower threshold, A, and less-than-or-equal to an upper threshold, B;
setting the MU-rate to MCS(x−2) when the upper threshold, B, is less than the PER; and
maintaining the MU-rate unchanged otherwise, wherein the MU-rate is MCS(x).

5. The method of claim 4, wherein the lower threshold, A, is equal to 0.1, and the upper threshold, B, is equal to 0.5.

6. The method of claim 1, wherein re-adjusting the MU-rate following the in-loop sounding comprises:
detecting a PER for a first aggregated media access control (MAC) protocol data unit (AMPDU) of a preceding sounding interval;
setting the MU-rate to MCS(x−1) when the PER is greater than an upper threshold, C;
setting the MU-rate to MCS(x+1) following the in-loop sounding when an average of PERs of the first N AMPDUs in preceding sounding intervals is less than a lower threshold, D, where N is a predetermined positive integer; and
maintaining the MU-rate unchanged otherwise, wherein the MU-rate is MCS(x).

7. The method of claim 6, wherein the upper threshold, C, equals 0.5, and the lower threshold, D, is less than 0.01.

8. A non-transitory computer-readable medium storing computer-executable instructions for providing dual-mode rate control in a multi-user wireless communication system, the instructions when executed by a processor cause the processor to execute a process comprising:
in a single-user mode (SU-mode), determining an SU-basic rate for a station in the wireless communication system based on channel conditions; and
in a multi-user mode (MU-mode), determining an adjusted MU-rate using tracking for a plurality of stations, the tracking further comprising:
performing an initial sounding for each of the plurality of stations;
initializing an MU-rate;
sending a transmission to the plurality of stations using the MU-rate;
detecting a packet error rate (PER) corresponding to the transmission to the plurality of stations;
adjusting the MU-rate based on the PER;
performing an in-loop sounding when triggered; and
re-adjusting the MU-rate following the in-loop sounding.

9. The computer-readable medium of claim 8, wherein initializing the MU-rate comprises:
selecting one of a 2-user MU operation and a 3-user MU operation; and
selecting an initial MU-rate based on a number of users and the SU-basic rate.

10. The computer-readable medium of claim 9, wherein selecting the initial MU-rate based on the number of users and the SU-basic rate comprises:
for 2-user MU operation:
selecting modulation and coding scheme (MCS) 9 when the SU-basic rate equals MCS9,
selecting MCS7 when the SU-basic rate equals MCS8, and
selecting MCS(x−2) when the SU-basic rate is MCS(x) wherein x is an integer less than eight; and
for 3-user MU operation,
selecting MCS7 when the SU-basic rate equals MCS9,
selecting MCS(x-3) when the SU-basic rate is MCS(y) wherein y is an integer less than or equal to eight and greater than 3.

11. The computer-readable medium of claim 8, wherein adjusting the MU-rate comprises:
setting the MU-rate to MCS(x−1) when the PER is greater-than-or-equal-to a lower threshold, A, and less-than-or-equal to an upper threshold, B;
setting the MU-rate to MCS(x−2) when the upper threshold, B, is less than the PER; and
maintaining the MU-rate unchanged otherwise, wherein the MU-rate is MCS(x).

12. The computer-readable medium of claim 11, wherein the lower threshold, A, is equal to 0.1, and the upper threshold, B, is equal to 0.5.

13. The computer-readable medium of claim 8, wherein re-adjusting the MU-rate following the in-loop sounding comprises:
detecting a PER for a first aggregated media access control (MAC) protocol data unit (AMPDU) of a preceding sounding interval;
setting the MU-rate to MCS(x−1) when the PER is greater than an upper threshold, C;
setting the MU-rate to MCS(x+1) following the in-loop sounding when an average of PERs of the first N AMPDUs in preceding sounding intervals is less than a lower threshold, D, where N is a predetermined positive integer; and
maintaining the MU-rate unchanged otherwise, wherein the MU-rate is MCS(x).

14. The computer-readable medium of claim 13, wherein the upper threshold, C, equals 0.5, and the lower threshold, D, is less than 0.01.

15. A method for dual-mode rate control in a wireless communication system, comprising:
in a first mode:
communicating using a first mode transmission rate;
adjusting the first mode transmission rate according to a rate-tracking strategy; and
switching to a second mode upon occurrence of a first condition, otherwise, continuing at communicating during the first mode;
in the second mode:
performing an initial sounding;
initializing a second mode transmission rate using a rate-setting strategy;
communicating in the second mode using the second mode transmission rate;

reducing the second mode transmission rate using a rate-reduction strategy;

performing an in-loop sounding upon occurrence of a second condition, updating the second mode transmission rate, and continuing at communicating in the second mode; otherwise returning to communicating using the first mode transmission rate upon occurrence of a third condition; otherwise continuing at communicating in the second mode.

16. The method of claim 15, wherein the first mode further comprises a single-user mode (SU-mode) of operation, and the second mode further comprises a multi-user mode (MU-mode) of operation.

17. The method of claim 16, wherein the first condition further comprises a multi-user traffic load exceeding an upper threshold, and the third condition further comprises the multi-user traffic load being less than a lower threshold.

18. The method of claim 16, wherein the second condition further comprises a new sounding being needed to refresh channel state information (CSI).

19. The method of claim 16, further comprising determining an initial value of an SU-mode transmission rate before a first entry into the SU-mode.

20. The method of claim 19, further comprising adjusting the SU-mode transmission rate according to the rate-tracking strategy.

21. The method of claim 20, further comprising using the adjusted first mode transmission rate for all SU-mode transmissions after a first SU-mode transmission.

22. The method of claim 16, wherein the rate-setting strategy further comprises setting the second mode transmission rate to a most recently adjusted SU-mode transmission rate.

23. The method of claim 16, wherein the rate-setting strategy further comprises setting the second mode transmission rate as a function of a number of users and the first mode transmission rate.

24. The method of claim 23, wherein the function of the number of users and the first mode transmission rate further comprises:

for 2-user MU operation:
selecting modulation and coding scheme (MCS) 9 when the first mode transmission rate equals MCS9,
selecting MCS7 when the first mode transmission rate equals MCS8, and
selecting MCS(x−2) when the first mode transmission rate is MCS(x) wherein x is an integer less than eight; and for 3-user MU operation,
selecting MCS7 when the first mode transmission rate equals MCS9,
selecting MCS(x−3) when the first mode transmission rate is MCS(y) wherein y is an integer less than or equal to eight and greater than 3.

25. The method of claim 16, wherein reducing the second mode transmission rate using the rate-reduction strategy further comprises:

setting the second mode transmission rate to MCS(x−1) when a first threshold, A, is less-than-or-equal to the PER, and the PER is less-than-or-equal to a second threshold, B;
setting the second mode transmission rate to MCS(x−2) by 2 when the second threshold B is less than the PER; and
maintaining the second mode transmission rate unchanged otherwise, wherein the second mode transmission rate is MCS(x).

26. The method of claim 25, wherein the first threshold, A, is equal to 0.1, and the second threshold, B, is equal to 0.5.

27. The method of claim 16, wherein updating the second mode transmission rate further comprises:

detecting a PER for a first aggregated media access control (MAC) protocol data unit (AMPDU) of a preceding sounding interval;
setting the second mode transmission rate to MCS(x−1) when the PER is greater than a third threshold, C;
setting the second mode transmission rate to MCS(x+1) when an average of PERs of the first N AMPDUs in preceding sounding intervals is less than a fourth threshold, D, where N is a predetermined positive integer; and
maintaining the second mode transmission rate unchanged otherwise, wherein the second mode transmission rate is MCS(x).

28. The method of claim 27, wherein the third threshold, C, equals 0.5, the fourth threshold, D, is less than 0.01.

29. The method of claim 15, wherein the second condition further comprises passage of a predetermined interval of time since last sounding during the current mode.

30. The method of claim 29, wherein the predetermined interval is within a range of 10 to 200 mSec.

31. A method for dual-mode transmission rate control in a wireless communication system, comprising:

in a single-user mode (SU-mode) of operation,
determining an SU-basic rate;
transmitting data using the SU-basic rate;
adjusting the SU-basic rate using tracking; and
suspending operation in the SU-mode and switching to a multiple-user mode (MU-mode) of operation upon occurrence of a first condition, and otherwise continuing operating in the SU-mode;

in the MU-mode of operation,
performing an initial sounding and initializing an MU-basic rate;
transmitting a first aggregated media access control (MAC) protocol data unit (AMPDU) using the MU-basic rate;
detecting a packet error rate (PER) for the transmitted AMPDU;
determining an MU-current rate and using the MU-current rate to transmit a next AMPDU;
performing an in-loop sounding, determining the MU-basic rate, and continuing from transmitting a first AMPDU upon occurrence of a second condition, otherwise continuing; and
suspending MU-mode operation and resuming SU-mode operation upon occurrence of a third condition, otherwise continuing from detecting the packet error rate.

32. The method of claim 31, wherein the first condition further comprises a multi-user traffic load exceeding an upper threshold, the second condition further comprises a new sounding being needed to refresh channel condition information, and the third condition further comprises the multi-user traffic load being less than a lower threshold.

33. The method of claim 31, wherein initializing the MU-basic rate further comprises:

selecting one of 2-user MU operation and a 3-user MU operation; and
selecting an initial MU-basic rate based on a number of users and the SU-basic rate.

34. The method of claim 33, wherein selecting the initial MU-basic rate further comprises:

for 2-user MU operation:
selecting modulation and coding scheme (MCS) 9 when the SU-basic rate equals MCS9,
selecting MCS7 when the SU-basic rate equals MCS8, and selecting MCS(x-2) when the SU-basic rate is MCS(x) wherein x is an integer less than eight; and for 3-user MU operation, selecting MCS7 when the SU-basic rate equals MCS9, and selecting MCS(x−3) when the SU-basic rate is MCS(y) wherein y is an integer less than or equal to eight and greater than 3.

35. The method of claim 31, wherein determining the MU-current rate further comprises:

setting the MU-current rate to MCS(x−1) when the PER is greater-than-or-equal-to a first threshold, A, and less-than-or-equal to a second threshold, B;

setting the MU-current rate to MCS(x−2) when the second threshold, B, is less than the PER; and maintaining the MU-current rate unchanged otherwise, wherein the MU-current rate is MCS(x).

36. The method of claim 35, wherein the first threshold, A, is equal to 0.1, and the second threshold, B, is equal to 0.5.

37. The method of claim 31, wherein determining the MU-basic rate further comprises:

detecting a PER for a first aggregated media access control (MAC) protocol data unit (AMPDU) of a preceding sounding interval;

setting the MU-basic rate to MCS(x−1) when the PER is greater than a third threshold, C;

setting the MU-basic rate to MCS(x+1) following the in-loop sounding when an average of PERs of the first N AMPDUs in preceding sounding intervals is less than a fourth threshold, D, where N is a predetermined positive integer; and maintaining the MU-basic rate unchanged otherwise, wherein the MU-basic rate is MCS(x).

38. The method of claim 37, wherein the third threshold, C, equals 0.5, the fourth threshold, D, is less than 0.01.

* * * * *